E. A. RUMELY.
TRACTION WHEEL.
APPLICATION FILED SEPT. 28, 1912.
1,104,934.
Patented July 28, 1914.
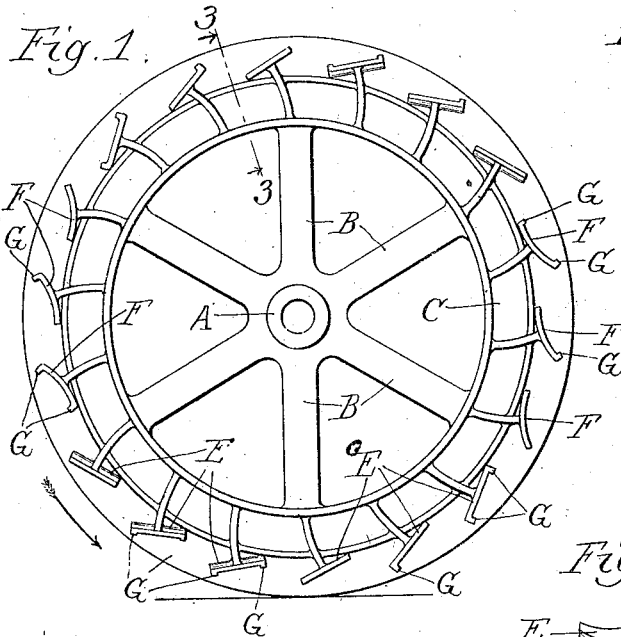
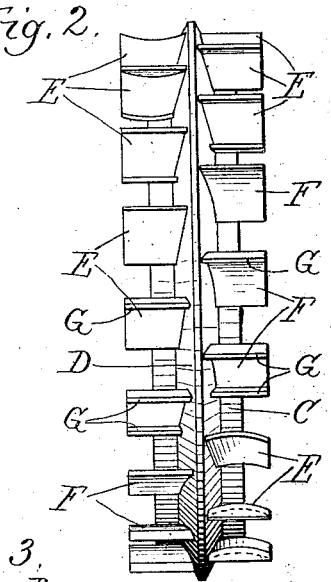
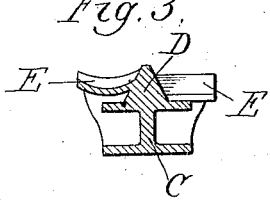
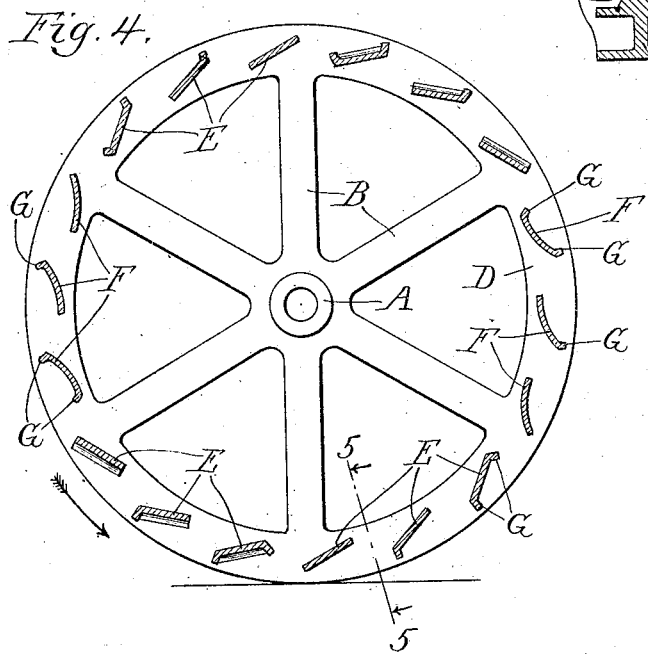
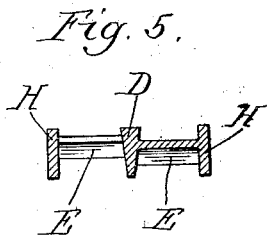
Witnesses
Edward T. Wray
Minnie M. Lindeman
Inventor
Edward A. Rumely
by Parker & Carter
Attorneys

UNITED STATES PATENT OFFICE.

EDWARD ALOYSIUS RUMELY, OF LAPORTE, INDIANA, ASSIGNOR TO M. RUMELY COMPANY, OF LAPORTE, INDIANA, A CORPORATION OF INDIANA.

TRACTION-WHEEL.

1,104,934.  Specification of Letters Patent.  Patented July 28, 1914.

Application filed September 28, 1912.  Serial No. 722,822.

*To all whom it may concern:*

Be it known that I, EDWARD ALOYSIUS RUMELY, a citizen of the United States, residing at Laporte, in the county of Laporte and State of Indiana, have invented a certain new and useful Improvement in Traction-Wheels, of which the following is a specification.

My invention relates to traction wheels, particularly such as are adapted to be used in connection with road or field engines, and the like, and it belongs to that class of wheels wherein a series of separated tread sections are so disposed about the periphery of the wheel as to carry the load and at the same time present to the surface of the ground as the wheel rotates, surfaces which are inclined to their respective radii.

One object of my invention is to provide means whereby the grip or hold of the wheel upon the ground may be strengthened, and another is to provide means whereby the wheel may be better adapted to travel on both soft and hard surfaces.

My invention is illustrated in one form in the accompanying drawings, wherein—

Figure 1 is a side elevation of the wheel showing various forms of the tread sections; Fig. 2 is a front elevation of the same; Fig. 3 is a cross section on the line 3—3 of Fig. 1; Fig. 4 is a side elevation of a modified form of wheel; Fig. 5 is a cross section on the line 5—5 of Fig. 4.

Like parts are indicated by like letters in all the figures.

A is the hub, B, B the spokes and C the rim of the wheel, the whole shaped in any desired form.

D is a continuous outer tread, wedge shaped in cross section, and having a relatively narrow exterior tread surface.

E, E are inner tread sections preferably integral with, or firmly attached to the rim, and the outer tread sections. They are preferably shaped so as to present an outer depressed surface, and the preferred form is that of a concave surface such as is illustrated at F, with or without the edge G. There may be two or more continuous treads, and a convenient arrangement is that wherein there are three, the two outer treads H, H, and the middle tread D, having between them the series of tread portions which make up the inner discontinuous tread or treads.

It will be understood that the drawing is to be taken more or less diagrammatically, and is intended not so much to present a working drawing as to present an illustrative drawing to accompany the description. I do not wish to be confined to the size, proportion or precise arrangement, or shape or shapes of the several parts.

The use and operation of my invention are as follows: In its preferred form, or what now appears to me to be the preferred form, there are two or more inner treads, each consisting of a series of tread portions. The members of each series are somewhat widely separated and not overlapped, but the series are arranged so that there will be about the periphery of the wheel an unbroken succession of such tread series so that the wheel will always have a bearing on the ground. Each tread portion is, broadly speaking, depressed or concave on its working face, so that it tends to hold or grip the earth immediately under it, and thus it will sustain the load and aid the traction wheel in performing its function. The arrangement is such that the material will pass between the sections and forwardly toward the hub of the wheel to make it a self-cleaning wheel. This action is further aided by the inclined surface of that portion of the rim which forms the approximately continuous tread. In the preferred form, the several tread portions or surfaces of any given series are quite widely separated, as shown, to permit the earthy materials to pass inwardly toward the hub. One or more portions of the rim projects beyond the outer extremities of these tread sections, and such rim may be of any desired width, but preferably quite narrow. This rim is preferably provided with its sides inclined as indicated in cross section so as to cause it to aid in the self-cleaning action. Since the rim projects beyond the tread portions, it becomes itself a tread portion when traveling on hard ground, and may even under some circumstances be the only acting tread. It is preferably so narrow that on soft ground it sinks in and performs a relatively small amount of the service of sustaining the load. Thus my wheel is provided with two tread surfaces, one an approximately continuous outer surface effective on hard ground or highways, the other a series of discontinuous inner treads effective on soft ground and protected on hard ground by the continuous tread which then carries the load. From one point of view, the important feature of my invention is thus the combination of approximately continuous treads for effective work on hard ground and discontinuous treads for effective work on soft ground, or more broadly, the combination of two kinds of treads, one operative only when the tractor is on hard ground, and the other one operative only when the tractor is on soft ground. To make a self-cleaning wheel, it is highly important that the discontinuous tread sections shall be relatively widely spaced. The soft ground tread must have wide surfaces and the hard ground tread must project beyond the soft ground tread.

I claim:

1. A traction wheel provided with an outer continuous tread rim an inner tread located intermediate the tread portion of said tread rim and center portion of the wheel and to one side of said rim made of a plurality of widely extended separated surfaces inclined to the tangent to the continuous tread all of them being inclined in the same direction a free passage between said surfaces inwardly along the continuous tread rim said widely extended tread surfaces being convex.

2. A traction wheel provided with an outer continuous tread rim an inner tread located intermediate the tread portion of said tread rim and center portion of the wheel and to one side of said rim made of a plurality of widely extended separated surfaces inclined to the tangent to the continuous tread all of them being inclined in the same direction a free passage between said surfaces inwardly along the continuous tread rim said widely extended tread surfaces being convex and provided with retaining walls along one side thereof.

3. A traction wheel provided with an outer continuous tread rim an inner tread located intermediate the tread portion of said tread rim and center portion of the wheel and to one side of said rim made of a plurality of widely extended separated surfaces inclined to the tangent to the continuous tread all of them being inclined in the same direction a free passage between said surfaces inwardly along the continuous tread rim said widely extended tread surfaces being convex and provided with retaining walls along one side thereof and an auxiliary outer continuous tread rim along the opposed side of said widely extended surfaces.

In testimony whereof, I affix my signature in the presence of two witnesses this 12th day of September, 1912.

EDWARD ALOYSIUS RUMELY.

Witnesses:
MINNIE M. LINDENAN,
GENEVA HIRTH.